United States Patent
Ito

(10) Patent No.: US 7,095,464 B2
(45) Date of Patent: Aug. 22, 2006

(54) LIQUID CRYSTAL DISPLAY OF TRANSMISSION TYPE

(75) Inventor: Yoji Ito, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/343,643

(22) PCT Filed: Oct. 4, 2002

(86) PCT No.: PCT/JP02/10379

§ 371 (c)(1),
(2), (4) Date: Feb. 3, 2003

(87) PCT Pub. No.: WO03/032061

PCT Pub. Date: Apr. 17, 2003

(65) Prior Publication Data

US 2004/0032546 A1    Feb. 19, 2004

(30) Foreign Application Priority Data

Oct. 4, 2001 (JP) .............................. 2001-308652

(51) Int. Cl.
G02F 1/1335    (2006.01)
(52) U.S. Cl. ......................... 349/112; 349/117
(58) Field of Classification Search ............. 349/112, 349/117, 118, 119, 121
See application file for complete search history.

(56) References Cited

U.S. PATENT DOCUMENTS

| | | | | |
|---|---|---|---|---|
| 5,645,901 A | * | 7/1997 | Fukuchi et al. | 428/1.4 |
| 5,667,854 A | * | 9/1997 | Yamada | 428/1.31 |
| 5,759,643 A | * | 6/1998 | Miyashita et al. | 428/1.31 |
| 5,855,971 A | * | 1/1999 | Kobori et al. | 428/1.2 |
| 6,064,524 A | * | 5/2000 | Oka et al. | 359/582 |
| 6,280,063 B1 | * | 8/2001 | Fong et al. | 362/333 |
| 6,307,608 B1 | * | 10/2001 | Sakamoto | 349/119 |
| 6,654,085 B1 | * | 11/2003 | Koike et al. | 349/112 |

FOREIGN PATENT DOCUMENTS

| | | |
|---|---|---|
| JP | 9-292522 A | 11/1997 |
| JP | 10-293211 A | 11/1998 |
| JP | 2000-330106 A | 11/2000 |
| JP | 2001-42127 A | 2/2001 |
| JP | 2001-100044 A | 4/2001 |
| JP | 2001-242462 A | 9/2001 |
| JP | 2001-264524 A | 9/2001 |

* cited by examiner

Primary Examiner—Andrew Schechter
Assistant Examiner—David Y. Chung
(74) Attorney, Agent, or Firm—Buchanan Ingersoll PC

(57) ABSTRACT

A liquid crystal display of transmission type comprises a light source, a polarizing film, a liquid crystal cell and another polarizing film in this order. An optical compensatory sheet is further provided between the liquid crystal cell and the polarizing film on a light source side or between the liquid crystal cell and the polarizing film on a display side. The optical compensatory sheet comprises a transparent support and an optically anisotropic layer. The optically anisotropic layer contains a discotic compound having a discotic plane. The discotic plane is inclined from a surface of the support surface at an angle. The angle varies along a direction of depth of the optically anisotropic layer. The liquid crystal display has a difference in chromaticity ($\Delta Cuv$) of 0.05 or less. The difference is measured between an image seen frontally and an image seen rightward or leftward at a viewing angle of 60°.

11 Claims, 1 Drawing Sheet

LIQUID CRYSTAL DISPLAY OF TRANSMISSION TYPE

FIELD OF INVENTION

The present invention relates to a liquid crystal display of transmission type, which hardly reflects outside light, and which has a large viewing angle.

BACKGROUND OF INVENTION

A liquid crystal display generally comprises a polarizing plate and a liquid crystal cell.

The most widely used display is a TFT liquid crystal display of TN mode. Japanese Patent Provisional Publication Nos. 8(1996)-50206, 7(1995)-191217 and European Patent No. 0911656A2 discloses a TFT liquid crystal display of TN mode showing an image of high quality, in which an optical compensatory sheet is provided between the polarizing plate and the liquid crystal cell.

However, gradation of an image displayed by the TFT liquid crystal display is often inverted when the screen is seen downward. Further, the screen reflects light coming from outside to impair the image quality. Furthermore, chromaticity of the image depends on what viewing angle the screen is seen at.

SUMMARY OF INVENTION

An object of the present invention is to provide a liquid crystal display having an optically anisotropic layer containing a liquid crystal compound. The optically anisotropic layer widens the viewing angle in which the display is properly seen.

Another object of the invention is to provide a liquid crystal display particularly improved in preventing inversion of gradation when the display is seen downward.

A further object of the invention is to provide a liquid crystal display particularly prevented from reflecting surrounding scenes.

A furthermore object of the invention is to provide a liquid crystal display remarkably improved in viewing angle dependence of chromaticity.

The present invention provides a liquid crystal display of transmission type which comprises a light source, a polarizing film, a liquid crystal cell and another polarizing film in this order, an optical compensatory sheet being further provided between said liquid crystal cell and said polarizing film on a light source side or between said liquid crystal cell and said polarizing film on a display side, said optical compensatory sheet comprising a transparent support and an optically anisotropic layer, which contains a discotic compound having a discotic plane, which is inclined from a surface of the support surface at an angle varying along a direction of depth of the optically anisotropic layer, wherein the liquid crystal display has a difference in chromaticity ($\Delta$Cuv) of 0.05 or less between an image seen frontally and an image seen rightward or leftward at a viewing angle of 60°.

A diffusing means can be provided on a display side surface of the polarizing film on the display side. The diffusing means is a diffusing film having a diffusing layer in which transparent fine particles are dispersed in a transparent resin, said transparent fine particles having refractive indices that are different from a refractive index of the transparent resin. The difference in refractive index between the transparent fine particles and the transparent resin is preferably in the range of 0.02 to 0.15. The transparent fine particles preferably have a mean particle size in the range of 0.5 to 2.0 µm. The diffusing film preferably has a haze value of 40% or more.

A low refractive index layer is preferably provided as an anti-reflection layer on the diffusing layer, said low refractive index layer having a refractive index of 1.35 to 1.45. The low refractive index layer is preferably made of a hardened composition comprising inorganic fine particles and a fluorine-containing compound cross-linked with heat or ionization radiation.

The diffusing film preferably shows an integrating sphere reflectance of 2.5% or less in the wavelength region of 450 to 650 nm.

The transparent support of the optical compensatory sheet preferably is a cellulose acetate film comprising cellulose acetate having an acetic acid content of 59.0 to 61.5% and an aromatic compound having at least two aromatic rings in an amount of 0.01 to 20 weight parts per 100 weight parts of the cellulose acetate, said film giving the Re retardation value defined by the following formula (I) in the range of 0 to 200 nm and the Rth retardation value defined by the following formula (II) in the range of 70 to 400 nm:

$$Re = (nx-ny) \times d \quad (I)$$

$$Rth = \{(nx+ny)/2 - nz\} \times d \quad (II)$$

in which nx is a refractive index along the slow axis in the film plane, ny is a refractive index along the traveling axis in the film plane, nz is a refractive index along the depth of the film, and d is thickness of the film.

The cellulose acetate film is preferably formed from a solution containing a solvent selected from a group consisting of an ether having 3 to 12 carbon atoms, a ketone having 3 to 12 carbon atoms, and an ester having 3 to 12 carbon atoms. The cellulose acetate film preferably comprises two or more layers, which are formed according to co-casting method.

The liquid crystal cell is preferably of a TN mode or an OCB mode.

The liquid crystal display of transmission type generally comprises a light source in the form of a plate.

The liquid crystal cell generally comprises a pair of glass substrates placed face-to-face via a gap. Each substrate has a transparent conductive electrode on the inner surface. Between the substrates, a liquid crystal compound is inserted.

The optical compensatory sheet may be provided both between the liquid crystal cell and the light source side-polarizing film and between the liquid crystal cell and the observer side-polarizing film.

The compound having discotic structure is generally a discotic liquid crystal compound or its polymerized polymer.

In the liquid crystal display, the angle between the discotic plane and the support surface preferably increases along the direction of depth of the optically anisotropic layer according as the distance from the bottom of the layer increases.

The angle preferably varies within the range of 5 to 85°.

The minimum of the angle is preferably in the range of 0 to 85°, and more preferably in the range of 5 to 40°. The maximum of the angle is preferably in the range of 5 to 90°, and preferably in the range of 30 to 85°.

An orientation layer is preferably provided between the optically anisotropic layer and the transparent support.

One of the paired substrates preferably has a (transparent) pixel electrode, and the other preferably has a counter transparent electrode and a color filter. The (transparent) pixel electrode preferably comprises TFT (thin-film-transistor) or MIM (metal-insulator-metal) as a non-linear active device.

Two absorbing axes of the paired polarizing films are preferably crossed perpendicularly to each other, and the liquid crystal cell works in normally white mode.

Two absorbing axes of the paired polarizing films are also preferably placed parallel to each other, and the liquid crystal cell works in normally black mode.

The optically anisotropic layer preferably has the minimum retardation whose absolute value is not 0 and which is observed in a direction inclined from the normal of the optical compensatory sheet. The substrates of the liquid crystal cell preferably have orientation surfaces subjected to rubbing treatment in a certain direction, and the optical compensatory sheet is placed so that said rubbing direction may be at an angle of 90° to 270° to the direction obtained by projecting the direction giving the minimum retardation onto the cell.

Figure 1:
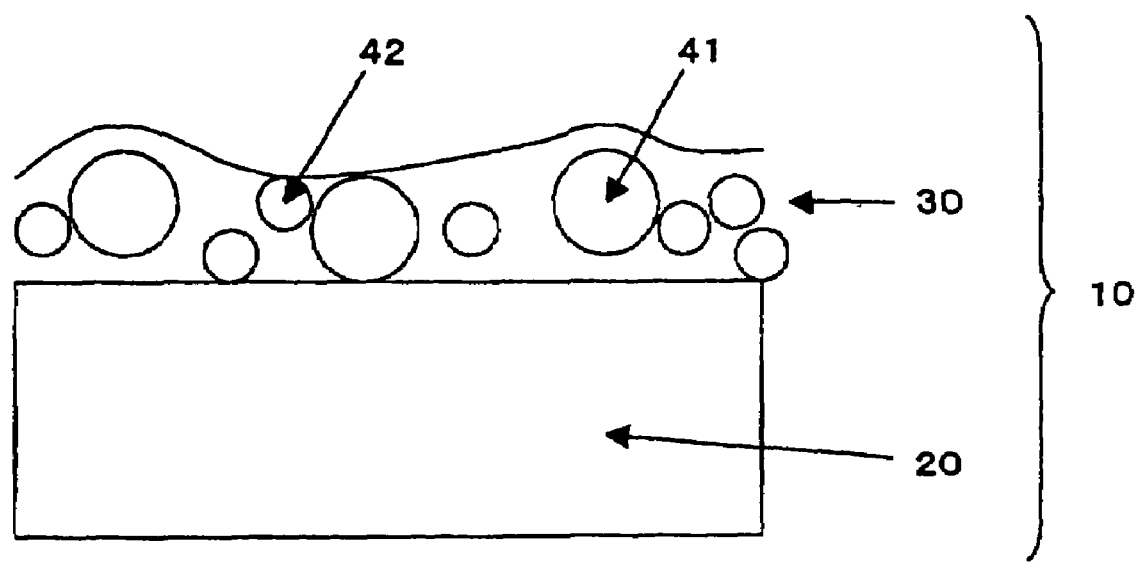
FIG. 1 is a sectional view schematically illustrating the diffusing film.

DETAILED DESCRIPTION OF INVENTION (Viewing Angle Dependence of Chromaticity)

The chromaticity of image is preferably represented in Luv coordinate, in order to visually express differences. A sensory difference in chromaticity can be evaluated in terms of Cuv value defined by the following formula:

$$Cuv = (u^{*2} + v^{*2})^{1/2}$$

$$u^* = u - u_0$$

$$v^* = v - v_0$$

(u, v): chromaticity of image seen frontally, ($u_0$, $v_0$): chromaticity of image seen rightward or leftward at the viewing angle of 60°.

The chromaticity difference Cuv is preferably 0.04 or less, more preferably 0.03 or less, and most preferably 0.02 or less. If the Cuv is 0.04 or less, there is practically no problem. If the Cuv is 0.02 or less, the chromaticity difference cannot be recognized with the naked eyes.

(Diffusing Means)

The liquid crystal display preferably has a diffusion means, which more preferably is a diffusing film on a display side. A film that refracts or scatters light can be used as the diffusing film. Examples of the film include a microlens film comprising micro lenses, a lenticular film, a film containing fine particles, a film having rough surface, a film in which various refractive indexes are distributed, and a film having diffraction grating. The diffusing film is described in Japanese Patent No. 2,822,983, Japanese Patent Publication Nos. 2001-33783, 2001-56461, 2000-121809, 2000-180611, 2000-338310, Japanese Patent Provisional Publication Nos. 6(1994)-18706, 10(1998)-20103, 11(1999)-160505, 11(1999)-305010 and 11(1999)-326608. The film containing fine particles that can be mass-produced at small cost is preferably used.

A preferred embodiment of the diffusing film containing fine particles is described below.

FIG. 1 shows a diffusing film (10) used in the invention. The diffusing film (10) comprises a transparent base film (20) and a diffusing layer (30) provided thereon. The diffusing layer (30) comprises a transparent resin (31) and therein-dispersed, for example, first transparent fine particles (41) and second transparent fine particles (42). The explanation here is given in the case where two kinds of fine particles having different refractive indexes are contained in the diffusing layer, but three or more kinds of fine particles may be used.

The first transparent fine particles (41) are, for example, fine particles of silica (mean particle size: 1.0 μm, refractive index: 1.51). The second transparent fine particles (42) are, for example, beads of styrene (mean particle size: 3.5 μm, refractive index: 1.61).

The refractive indices of transparent fine particles are preferably different from the refractive index of the transparent resin.

The difference of refractive index between the transparent fine particles (the first particles (41) and the second particles (42)) and the transparent resin is in the range of 0.02 to 0.15. If the difference is less than 0.02, it is too small for the film to diffuse light. If the difference is more than 0.15, light is so diffused that the whole film is whitened and opaqued. The refractive index difference is preferably in the range of 0.03 to 0.13, more preferably in the range of 0.04 to 0.10.

The first transparent fine particles (41) have a mean particle size of 0.5 to 2.0 μm. Such particle size gives proper angular distribution of light scattering.

In order to improve the image quality (to improve the viewing angle character), it is necessary to diffuse incident light in a certain degree. The more the incident light is diffused, the more the viewing angle character is improved. On the other hand, for keeping brightness of the image seen frontally, it is necessary to increase the transparency.

If the mean particle size is 0.5 μm or less, the incident light is scattered so much that the viewing angle character is remarkably improved. However, at the same time, the light is scattered backward so much that the brightness is considerably lowered. If the mean particle size is 2.0 μm or more, the incident light is scattered so little that the viewing angle character is insufficiently improved. Accordingly, the mean particle size of the first transparent fine particles (41) is preferably in the range of 0.6 to 1.8 μm, more preferably in the range of 0.7 to 1.6 μm.

The second transparent fine particles (42) have a mean particle size of 2.0 to 5.0 μm. Such particle size gives proper surface scattering.

In order to improve the image quality, it is also necessary to prevent the display surface (screen) from reflecting surrounding scenes.

The lower haze value the display surface has, the clear image the display gives. However, if the haze value is too low, surrounding scenes are reflected and sparkles (scintillations) are observed. If the haze value is too high, the display surface is whitened. Accordingly, the haze value ($h_s$) of the display surface satisfies the condition of preferably $0.5 < h_s < 30$, more preferably $7 \leq h_s \leq 20$, most preferably $7 \leq h_s > 15$.

The fine particles make the surface of the film (display surface) rough so adequately that the haze value may be in the above range. The haze value can be determined by means of a measuring apparatus (HR-100, Murakami Shikisai Gijutsu-kenkyujo Co., Ltd,) according to JIS-K-7105.

If the mean particle size of the second fine particles (42) is 2.0 μm or less, the surface roughness is so little that incident light is not enough scattered to prevent the surface from reflecting surrounding scenes. If it is 5.0 µm or more, although the surface is rough enough to be prevented from reflecting surrounding scenes, the surface is remarkably whitened to impair the image quality. Accordingly, the mean particle size of the second transparent fine particles (42) is preferably in the range of 2.2 to 4.7 µm, more preferably in the range of 2.4 to 4.5 µm.

The surface roughness (Ra) is preferably 1.2 µm or less, more preferably 0.8 µm or less, most preferably 0.5 µm or less.

According to the study of the present applicant, the haze value, particularly the internal scattering haze (which contributes to diffusion of transmitted light) is related to viewing angle improvement.

Light emitted from the backlight is diffused by the diffusing film provided on the polarizing film of the observer side. The more the light is diffused, the more the viewing angle character is improved. However, if the light is diffused too much, the amount of light scattered backward is so increased that the brightness of the image seen frontally is decreased or that the clearness of the image is impaired. Accordingly, the internal scattering haze value is preferably in the range of 30 to 80%, more preferably in the range of 35 to 70%, most preferably in the range of 40 to 60%.

The internal scattering haze can be enhanced by increasing the amount of the fine particles having a mean particle size of 0.5 to 2.0 µm, by thickening the film, or by increasing the refractive index of the particles.

The film preferably has a rough surface giving an adequate surface haze to improve recognition of a displayed image. The resultant haze value (total of the internal scattering haze and the surface haze) is preferably in the range of 40 to 90%, more preferably in the range of 45 to 80%, most preferably in the range of 50 to 70%.

Since two or more kinds of transparent fine particles are mixed and used, the combination and mixing ratio can be freely selected to realize the optimum viewing angle character and to prevent the display surface from reflecting surrounding scenes.

The transparent fine particles (41) and (42) may be mono-dispersed organic or inorganic particles. The sizes of the particles are preferably uniform. If so, the scattering characters of the particles are almost the same, and accordingly the haze is easily controlled.

As the transparent fine particles, plastic beads are preferred. The plastic beads are preferably made of a material having high transparency, and the difference between the refractive index of the material and that of the transparent resin is preferably in the aforementioned range.

Examples of the material for the beads include polymethacrylate (refractive index: 1.49), acryl-styrene copolymer (refractive index: 1.55), melamine (refractive index: 1.57), polycarbonate (refractive index: 1.57), crosslinked polystyrene (refractive index: 1.61), polystyrene (refractive index: 1.60) and polyvinyl chloride (refractive index: 1.60).

The size of the plastic beads is preferably in the range of 0.5 to 5 µm, as described above. The amount of the beads is preferably in the range of 5 to 30 weight parts per 100 weight parts of the transparent resin.

Since the transparent fine particles are liable to settle down in the resin composition (transparent resin), inorganic filler such as silica may be added to prevent the particles from settling. The more the inorganic filler is added, the more the fine particles are prevented from settling. However, if it is too much added, the transparency of the film is impaired. Accordingly, the inorganic filler consisting of grains having sizes of 0.5 µm or less are preferably added in an amount of less than 0.1 wt. % based on the amount of the transparent resin. That amount of the filler hardly lowers the transparency.

(Transparent Resin)

The transparent resin preferably is an ionization radiation-setting resin, a mixture of ionization radiation-setting resin and thermoplastic resin in a solvent, or a thermosetting resin. The thickness of the diffusing film is normally in the range of 0.5 to 50 µm, preferably in the range of 1 to 20 µm, more preferably in the range of 2 to 10 µm, most preferably in the range of 3 to 7 µm.

The transparent resin has a refractive index preferably in the range of 1.50 to 2.00, more preferably in the range of 1.57 to 1.90, most preferably in the range of 1.64 to 1.80. The refractive index of the diffusing layer is determined by measuring the layer without the transparent fine particles. If the refractive index is too small, the layer cannot prevent reflection well. On the other hand, if it is too high, the reflected light is unfavorably colored.

The transparent resin comprises a binder. The binder is preferably a polymer having a main chain of saturated hydrocarbon or polyether, and the polymer is preferably cross-linked. The polymer having the main chain of saturated hydrocarbon is preferably prepared from ethylenically unsaturated monomers through polymerization reaction. The monomer preferably has two or more ethylenically unsaturated groups to form a cross-linked polymer.

Examples of the monomers having two or more ethylenically unsaturated polymerizable groups include esters of polyhydric alcohol and (meth)acrylic acid (e.g., ethylene glycol di(meth)acrylate, 1,4-dichlorohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,3,5-cyclohexanetriol trimethacrylate, polyurethane polyacrylate, polyester polyacrylate), vinylbenzene and derivatives thereof (e.g., 1,4-divinylbenzene, 4-vinylbenzoic acid-2-acryloyl ethylester, 1,4-divinylcyclohexanone), vinylsulfones (e.g., divinylsulfone), acrylamides (e.g., methylene bisacrylamide) and methacrylamide. In consideration of hardness and scratching resistance of the film, acrylate having five or more functional groups is preferred. A mixture of dipentaerythritol pentaacrylate and dipentaerythritol hexaacrylate is commercially available and particularly preferably used.

These monomers having two or more ethylenically unsaturated polymerizable groups are dissolved in a solvent together with various polymerization initiators and additives. The thus-prepared solution (coating solution) is applied on a support, dried and polymerized to harden by ionization radiation or heat.

In place of or in addition to the monomers having two or more ethylenically unsaturated polymerizable groups, cross-linking groups may be introduced into the binder to be cross-linked. Examples of the cross-linking group include isocyanate group, epoxy group, aziridine group, oxazolidine group, aldehyde group, carbonyl group, hydrazine group, carboxyl group, methylol group, and active methylene group. Further, the cross-linked structure can be obtained by the monomers such as vinylsulfonic acid, acid anhydride, cyanoacrylate derivative, melamine, etherized methylol, ester, urethane, and methal alkoxide (e.g., tetramethoxysilane). Furthermore, the binder may be cross-linked by decomposition of some monomers such as blockisocyanate group. As the cross-linking group, not only groups that immediately induce cross-linking reaction but also groups that are decomposed to cause the reaction can be used. The binder having the cross-linking group can be cross-linked by heating.

Besides the above binder polymer, the transparent resin comprises a copolymer of monomers having high refractive indexes and/or superfine particles of metal oxide having a high refractive index.

Examples of the monomers having high refractive indexes include bis(4-methacryloylthiophenyl)sulfide, vinylnaphthalene, vinylphenylsulfide, and 4-methacryloxyphenyl-4'-methoxyphenylthioether.

The metal oxide having a high refractive index is preferably an oxide of at least one metal selected from the group consisting of zirconium, titanium, aluminum, indium, zinc, tin and antimony. The size of the superfine particles is 100 nm or less, preferably 50 nm or less. Examples of the metal oxide include $ZrO_2$, $TiO_2$, $Al_2O_3$, $In_2O_3$, $ZnO$, $SnO_2$, $Sb_2O_3$ and ITO. Among then, $ZrO_2$ is particularly preferred. The amount of the superfine particles is in the range of 10 to 90 wt. %, preferably in the range of 20 to 80 wt. % based on the total amount of the transparent resin.

The diffusing layer containing the transparent resin is provided on the transparent base film. For forming the layer, a solution of the resin is applied on the film. As a solvent of the solution, at least one solvent dissolving the triacetyl cellulose support and at least one solvent not dissolving the support are used in combination. That mixed solvent prevents the layer from glaring, and at the same time enhances the adhesion between the layer and the support. Preferably, at least one solvent not dissolving the triacetyl cellulose support has a boiling point higher than at least one solvent dissolving the support. The highest boiling point of the solvents not dissolving the triacetyl cellulose support is higher than the lowest boiling point of the solvents dissolving the support more preferably by 30° C. or more, most preferably by 50° C. or more.

Examples of the solvent dissolving triacetyl cellulose include ethers having 3 to 12 carbon atoms (e.g., dibutyl ether, dimethoxymethane, dimethoxyethane, diethoxyethane, propylene oxide, 1,4-dioxane, 1,3-dioxane, 1,3,5-trioxane, teterahydrofuran, anisole, phenetole), ketones having 3 to 12 carbon atoms (e.g., acetone, methyl ethyl ketone, diethyl ketone, dipropyl ketone, diisobutyl ketone, cyclopentanone, cyclohexanone, methyl cyclohexanone), esters having 3 to 12 carbon atoms (e.g., ethyl formate, propyl formate, n-pentyl formate, methyl acetate, ethyl acetate, methyl propionate, ethyl propionate, n-pentyl acetate, γ-butyrolactone), organic solvents having two or more kinds of functional groups (e.g., methyl 2-methoxyacetate, methyl 2-ethoxyacetate, ethyl 2-ethoxypropionate, 2-methoxyehanol, 2-propoxyethanol, 2-butoxyethanol, 1,2-diacetoxyacetone, acetylacetone, diacetonealcohol, methyl acetoacetate, ethyl acetoacetate). These may be used singly or in combination.

Examples of the solvent not dissolving triacetyl cellulose include methanol, ethanol, 1-propanol, 2-propanol, 1-butanol, 2-butanol, tert-butanol, 1-pentanol, 2-methyl-2-butanol, cyclohexanol, isobutyl acetate, methyl isobutyl ketone, 2-ocyanone, 2-pentanone, 2-heptanone, 3-pentanone, 3-heptanone, and 4-heptanone. These may be used singly or in combination.

The ratio (A/B) between the total amount (A) of the solvents dissolving triacetyl cellulose and the total amount (B) of the solvents not dissolving triacetyl cellulose is preferably in the range of 1/99 to 50/50, more preferably in the range of 2/98 to 40/60, most preferably in the range of 15/85 to 30/70.

The aforementioned composition of ionization radiation-setting resin can be hardened in the normal manner, namely, by irradiation of electron beams or ultraviolet rays. In the irradiation of electron beams, various electron accelerators such as Cockcroft-Walton accelerator, Van de Graaff accelerator, resonant transforming accelerator, insulating core-transforming accelerator, linear accelerator, dinamitron, and radio-frequency accelerator can be used. The electron beams have energy in the range of 50 to 1,000 KeV, preferably in the range of 100 to 300 KeV. In the irradiation of ultraviolet rays, various light sources such as extra high pressure mercury lamp, high pressure mercury lamp, low pressure mercury lamp, carbon arc lamp, xenon arc lamp, and metal halide arc lamp can be used.

(Low Refractive Index Layer)

A low refractive index layer as an anti-reflection layer is preferably provided on the top surface of the diffusing film, to prevent the film from reflecting light coming from outside.

The low refractive index layer has a refractive index in the range of 1.35 to 1.45.

The refractive index of the low refractive index layer preferably satisfies the following formula (I):

$$(m\lambda/4) \times 0.7 < n1 \times d1 < (m\lambda/4) \times 1.3 \qquad \text{Formula (I):}$$

in which m is a positive odd number (usually 1), n1 is the refractive index of the low refractive index layer, d1 is the thickness (nm) of the low refractive index layer, and λ is a wavelength of visible light in the region of 450 to 650 nm.

When the refractive index (n1) satisfies the formula (I), a certain positive odd number (m) (which is usually 1) satisfying the formula (I) can be found in the above wavelength region.

The low refractive index layer can be made of a fluorine-containing resin prepared by hardening a thermosetting or ionization radiation-setting cross-linkable fluorine-containing compound. The hardened fluorine-containing resin has a coefficient of kinetic friction preferably in the range of 0.03 to 0.15, and gives a contact angle with water preferably in the range of 90° to 120°.

Examples of the cross-linkable fluorine-containing compound include a perfluoroalkyl-containing silane compound (e.g., (heptadecafluoro-1,1,2,2-tetradecyl)triethoxysilane) and a fluorine-containing copolymer derived from fluorine-containing monomers and monomers introducing cross-linking groups.

Examples of the fluorine-containing monomers include fluoroolefins (e.g., fluoroethylene, vinylidene fluoride, tetrafluoroethylene, hexafluoroethylene, hexafluoropropylene, perfluoro-2,2-dimethyl-1,3-dioxole), partially or completely fluorinated (meth)acrylic alkyl ester derivatives (e.g., Biscoat 6FM (Osaka Organic Chemicals Co., Ltd.), M-2020 (Daikin Co., Ltd.), and partially or completely fluorinated vinyl ethers.

Examples of the monomers introducing cross-linking groups include a (meth)acrylate monomer having a cross-linking group (e.g., glycidyl methacrylate), and a (meth)acrylate monomer having carboxyl, hydroxyl, amino or sulfonic acid group (e.g., (meth)acrylic acid, methylol (meth)acrylate, hydroxyalkyl (meth)acrylate, acrylate). After the (meth)acrylate monomers having carboxyl, hydroxyl, amino or sulfonic acid group are copolymerized, cross-linked structure can be formed in the manner described in Japanese Patent Provisional Publication Nos. 10(1998)-25388 and 10(1998)-147739.

As well as the copolymer derived from fluorine-containing monomers and monomers introducing cross-linking groups, a copolymer derived from these monomers and other monomers can be also used for the low refractive index layer.

The usable monomers other than the above monomers are not particularly restricted. Examples of them include olefins (e.g., ethylene, propylene, isoprene, vinyl chloride, vinylidene chloride), acrylate esters (e.g., methyl acrylate, ethyl acrylate, 2-ethylhexyl acrylate), methacrylate esters (e.g., methyl methacrylate, ethyl methacrylate, butyl methacrylate, ethylene glycol dimethacrylate), styrene derivatives (e.g., styrene, divinylbenzene, vinyltoluene, α-methylstyrene), vinyl ethers (e.g., methylvinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile derivatives.

In the fluorine-containing resin used in the low refractive index layer, superfine particles of Si oxide are preferably dispersed to make the layer tough against scratching. The mean size of the Si oxide particles is preferably in the range of not more than 0.1 μm, more preferably in the range of 0.001 to 0.05 μm. The lower refractive index the fluorine-containing resin has, the more the layer is prevented from reflecting light. However, if the refractive index is too low, the scratching resistance is impaired. Accordingly, the refractive index of the resin and the amount of the Si oxide particles are controlled so adequately that the refractive index and the scratching resistance may be optimally balanced.

As the superfine particles of Si oxide, commercially available silica sol dispersed in an organic solvent can be directly added to a coating solution for forming the low refractive index layer. Otherwise, various commercially available silica powders may be dispersed in an organic solvent to prepare a silica dispersion to use.

(Transparent Base Film)

The transparent base film is made of transparent resin or transparent glass. Examples of the transparent resin include triacetyl cellulose (TAC), polyethylene terephthalate (PET), diacetylene cellulose, acetatebutylate cellulose, poly(ether sulphone), polyacrylic resin, polyurethane resin, polyester, polycarbonate, polysulfone, polyether, poly(methyl pentene), poly(ether ketone), and (meth)acrylonitrile. The thickness of the base film is normally in the range of 25 to 1,000 μm.

The transparent base film is provided on the surface of the polarizing film, and hence is preferably made of cellulose acetate, which is generally used for a protective film of the polarizing film. Accordingly, the following explanation is described in the case where the transparent base film is made of cellulose acetate. The base film of cellulose acetate has both enough transparency and enough smooth surfaces to be preferably used in the diffusing film of the invention.

(Highly Transparent and Highly Smooth Cellulose Acetate Film)

Cellulose acetate preferably has an acetic acid content of 59.0 to 61.5%. The term "acetic acid content" means the amount of combined acetic acid per one unit weight of cellulose. The acetic acid content is determined according to ASTM: D-817-91 (tests of cellulose acetate).

The cellulose ester has a viscosity average polymerization degree (DP) of preferably 250 or more, more preferably 290 or more. Further, it is also preferred for the cellulose ester used in the invention to have a narrow molecular weight distribution of Mw/Mn (Mw and Mn are weight and number average molecular weights, respectively) which is determined by gel permeation chromatography. The value of Mw/Mn is preferably in the range of 1.0 to 1.7, more preferably in the range of 1.3 to 1.65, most preferably in the range of 1.4 to 1.6.

Generally, hydroxyl groups at 2-, 3- and 6-position of cellulose acylate are not equally substituted (namely, the substitution degree at each position is not equal to one third of the total substitution degree), and the substitution degree at 6-position is apt to be relatively small. In the cellulose acylate used in the invention, the substitution degree at 6-position is preferably larger than those at 2- and 3-positions. The hydroxyl group at 6-position is substituted with acyl group in an amount of preferably 32% or more, more preferably 33% or more, most preferably 34% or more, based on the total substitution degree. Further, the substitution degree of the acyl group at 6-position is preferably 0.88 or more. The hydroxyl group at 6-position may be substituted with acyl group other than acetyl. Examples of the other acyl group are acyl groups having 3 or more carbon atoms (e.g., propionyl, butyloyl, valeroyl, benzoyl, acryloyl). The substitution degree at each position can be measured by means of NMR.

Japanese Patent Provisional Publication No. 11(1999)-5851 discloses a method of preparing cellulose acylate.

(Preparation of Cellulose Acetate Film)

The cellulose acetate film is preferably prepared according to casting method. In the casting method, a dope in which cellulose acetate is dissolved in an organic solvent is used.

Examples of the organic solvent include an ether having 3 to 12 carbon atoms, a ketone having 3 to 12 carbon atoms, an ester having 3 to 12 carbon atoms, and a halogenated hydrocarbon having 1 to 6 carbon atoms.

The ether, the ketone or the ester may have a cyclic structure. A compound having two or more functional groups of ether, ketone or ester (—O—, —CO— or —COO—) is also usable as the solvent. The organic solvent may have other functional groups such as alcoholic hydroxyl. If the solvent is the compound having two or more functional groups, the number of carbon atoms is in any of the above ranges.

Examples of the ether having 3 to 12 carbon atoms include diisopropyl ether, dimethoxymethane, dimethoxyethane, 1,4-dioxane, 1,3-dioxolan, tetrahydrofuran, anisole and phenetole.

Examples of the ketone having 3 to 12 carbon atoms include acetone, methyl ethyl ketone, diethyl ketone, diisobutyl ketone, cyclohexanone and methylcyclohexane.

Examples of the ester having 3 to 12 carbon atoms include ethyl formate, propyl formate, pentyl formate, methyl acetate, ethyl acetate and pentyl acetate.

Examples of the compound having two or more functional groups include 2-ethoxyethyl acetate, 2-methoxyethanol and 2-butoxyethanol.

The halogenated hydrocarbon preferably has one or two carbon atoms, more preferably one carbon atom. The halogen is preferably chlorine. The hydrogen in the halogenated hydrocarbon is substituted with halogen in an amount of preferably 25 to 75 mol. %, more preferably 30 to 70 mol. %, further preferably 35 to 65 mol. %, most preferably 40 to 60 mol. %. A typical halogenated hydrocarbon is methylene chloride.

Two or more kinds of the solvents may be mixed to use in combination.

The cellulose acetate solution can be prepared in an ordinary manner. The term "ordinary manner" means that the preparation is carried out at a temperature of 0° C. or more (room temperature or elevated temperature). The cellulose acetate solution (dope) can be prepared through a common process by means of a common apparatus in the normal casting method. In the normal process, a halogenated hydrocarbon (particularly, methylene chloride) is preferably used as the solvent.

The amount of cellulose acetate in the solution is preferably in the range of 10 to 40 wt. %, more preferably in the range of 10 to 30 wt. %. To the organic (main) solvent, additives described below may be optionally added.

Cellulose acetate and the organic solvent are mixed and stirred at room temperature (0 to 40° C.) to prepare the solution. For preparing the concentrated solution, the preparation may be carried out at an elevated temperature under a high pressure. In that case, the cellulose acetate and the organic solvent are placed in a vessel resisting pressure. After the vessel is sealed, the mixture is stirred under an increased pressure at an elevated temperature. The temperature is controlled so that it may be higher than the boiling point of the solvent at atmospheric pressure, but so that the solvent may not boil. The temperature is normally in the range of 40° C. or more, preferably in the range of 60 to 200° C., more preferably in the range of 80 to 110° C.

Before placed in the vessel, the components of the solution may be beforehand mixed. They may be also successively added into the vessel. The vessel must be equipped with a stirring means. Inactive gas such as nitrogen gas may be charged in the vessel to increase the inner pressure. Otherwise, the vessel may be heated to elevate the vapor pressure of the solvent so that the inner pressure may increase. Further, after the vessel is sealed, each component may be added under an elevated pressure.

The vessel is preferably heated from outside. For example, a jacket heater is preferably used. Otherwise, liquid heated with a plate heater placed outside of the vessel may be made to flow through a pipe wound around the vessel, to heat the whole vessel.

The mixture is preferably stirred with a propeller mixer provided in the vessel. The wing of the propeller preferably has a length reaching the inside wall of the vessel. Further, at the tip of the wing, a scratching mean is provided to scratch and renew liquid attached on the inside wall.

In the vessel, various meters such as pressure gauge and thermometer may be provided. The components are dissolved in the solvent in the vessel. The thus-prepared dope may be cooled and then taken out of the vessel, or may be taken out and then cooled with a heat exchanger.

The solution can be prepared according to the cooling dissolution method, which makes it possible to dissolve cellulose acetate in an organic solvent in which cellulose acetate cannot be dissolved by a conventional process. Further, according to that method, cellulose acetate can be rapidly and homogeneously dissolved in an organic solvent in which cellulose acetate can be dissolved by a conventional process.

First in the process of cooling dissolution method, cellulose acetate is gradually added with stirring into an organic solvent at room temperature. The amount of cellulose acetate in the mixture is preferably in the range of 10 to 40 wt. %, more preferably in the range of 10 to 30 wt. %. Various additives described below may be added in the mixture.

The prepared mixture is cooled to a temperature of −100 to −10° C., preferably −80 to −10° C., more preferably −50 to −20° C., most preferably −50 to −30° C. The cooling procedure can be carried out, for example, with dry ice-methanol bath (−75° C.) or with cooled ethylene glycol solution (−30 to −20° C.). Through the cooling procedure, the mixture is solidified.

The cooling rate is preferably 4° C./minute or more, more preferably 8° C./minute or more, and most preferably 12° C./minute or more. The cooling rate is preferably as fast as possible. However, a theoretical upper limit of the cooling rate is 10,000° C. per second, a technical upper limit is 1,000° C. per second, and a practical upper limit is 100° C. per second. The cooling rate means the change of temperature at the cooling step per the time taken to complete the cooling step. The change of temperature means the difference between the temperature at which the cooling step is started and the temperature at which the cooling step is completed.

The cooled mixture is then warmed to a temperature of 0 to 200° C., preferably 0 to 150° C., more preferably 0 to 120° C., most preferably 0 to 50° C. Through the warming procedure, acetate is dissolved in the organic solvent. For warming, the mixture may be left at room temperature or may be heated in a warm bath.

The warming rate is 4° C./minute or more, more preferably 8° C./minute or more, and most preferably 12° C./minute or more. The warming rate is preferably as fast as possible. However, a theoretical upper limit of the cooling rate is 10,000° C. per second, a technical upper limit is 1,000° C. per second, and a practical upper limit is 100° C. per second. The warming rate means the change of temperature at the warming step per the time taken to complete the warming step. The change of temperature means the difference between the temperature at which the warming step is started and the temperature at which the warming step is completed.

Thus, a homogeneous solution can be prepared. If cellulose acetate is not sufficiently dissolved, the cooling and warming procedures may be repeated. It can be judged by observation with the eyes whether cellulose acetate is sufficiently dissolved or not.

In the process of cooling dissolution method, a sealed vessel is preferably used to prevent contamination of water, which may be caused by dew condensation at the cooling step. Further, the mixture may be cooled under a reduced pressure so that the time taken to complete the cooling step can be shortened, and hence a vessel resisting pressure is preferably used to conduct the procedures under a reduced pressure.

According to differential scanning calorimetric measurement (DSC), a 20 wt. % solution prepared by dissolving cellulose acetate (acetic acid content: 60.9%, viscosity average polymerization degree: 299) in methyl acetate through the cooling dissolution process has a pseudo-phase transition point between gel and sol at about 33° C. Below that temperature, the solution is in the form of homogeneous gel. The solution, therefore, must be kept at a temperature above the pseudo-phase transition point, preferably at a temperature higher than the pseudo-phase transition point by about 10° C. The pseudo-phase transition point depends upon various conditions such as the organic solvent, the acetic acid content, the viscosity average polymerization degree and the concentration of cellulose acetate.

The cellulose acetate film is formed from the prepared cellulose acetate solution (dope) according to the casting method.

The dope is cast on a drum or a band, and the solvent is evaporated to form a film. The solid content of the dope is preferably controlled in the range of 18 to 35%. The surface of the drum or band is preferably beforehand polished to be a mirror. The casting and drying steps of the casting method are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The surface temperature of the drum or band is preferably 10° C. or below. After cast on the drum or band, the dope is blown with air for 2 seconds or more to dry. The formed film is then peeled, and blown with hot air whose temperature is successively changed from 100° C. to 160° C. in order to evaporate remaining solvent. This procedure is described in Japanese Patent Publication No. 5(1993)-17844. The procedure can shorten the time taken to complete the steps of cooling to peeling. For performing the procedure, the cast dope must gel at the surface temperature of the drum or band.

From the prepared cellulose acylate solution (dope), a film comprising two or more layers can be formed. Also in that case, the film is preferably formed by the casting method. The dope is cast on a drum or a band, and the solvent is evaporated to form a film. The solid content of the dope is preferably controlled in the range of 10 to 40%. The surface of the drum or band is preferably beforehand polished to be a mirror.

Two or more cellulose acylate solutions can be cooperatively cast to form two or more layers. For example, two or more outlets are arranged at intervals along the running direction of the support (drum or band), and from each outlet each cellulose acylate solution is cast to form a layered film (Japanese Patent Provisional Publication Nos. 61(1986)-158414, 1(1989)-122419 and 11(1999)-198285). Otherwise, cellulose acylate solutions may be cast from two outlets to form a film (Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933). Further, a flow of high-viscous cellulose acylate solution may be enclosed with a flow of low-viscous one to form a layered flow, and the high- and low-viscous solutions in the layered flow may be simultaneously extruded to produce a film (Japanese Patent Provisional Publication No. 56(1981)-162617).

Further, Japanese Patent Publication No. 44(1969)-20235 discloses another film preparation. In the disclosed process, a cellulose acylate solution is cast on the support from one outlet to form a film. After peeled from the support, the formed film is turned over and again placed on the support. On the thus appearing surface (having been in contact with the support), another cellulose acylate solution is cast from another outlet to form a film.

The used cellulose acylate solutions may be the same or different from each other. The function of each cellulose acylate layer can be given by each corresponding solution extruded from each outlet.

Other functional layers (e.g., adhesive layer, dye layer, antistatic layer, anti-halation layer, UV absorbing layer, polarizing film) can be simultaneously formed from the cellulose acylate solutions in the above manner.

In a conventional single layer preparation process, it is necessary to extrude a cellulose acylate solution having such high concentration and such high viscosity that the resultant film may have the aimed thickness. Accordingly, that cellulose acylate solution is often so unstable that solid contents are deposited to cause troubles and to impair the planeness. To avoid the problem, plural concentrated cellulose acylate solutions are simultaneously extruded from outlets onto the support. The thus-prepared thick film has excellent planeness. In addition, since the concentrated solutions are used, the film is so easily dried that the productivity (particularly, production speed) can be improved.

A plasticizer can be added into the cellulose acylate solution to enhance mechanical strength of the resultant film or to shorten the time for drying. The plasticizer is, for example, a phosphate ester or a carbonate ester. Examples of the phosphate ester used as the plasticizer include triphenyl phosphate (TPP), diphenylbiphenyl phosphate, and tricresyl phosphate (TCP). Typical examples of the carbonate ester are phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrate esters include triethyl o-acetylcitrate (OACTE) and tributyl o-acetylcitrate (OACTB). Besides the above, butyl oleate, methylacetyl ricinolate, dibutyl sebacate and various trimellitic esters are also usable. The plasticizers of phosphate esters (DMP, DEP, DBP, DOP, DPP, DEHP) are preferred. Particularly preferred are DEP and DPP. The content of the plasticizer is preferably in the range of 0.1 to 25 wt. %, more preferably in the range of 1 to 20 wt. %, most preferably in the range of 3 to 15 wt. % based on the amount of cellulose ester.

Further, a deterioration inhibitor (e.g., oxidation inhibitor, peroxide decomposer, radical inhibitor, metal inactivating agent, oxygen scavenger, amine) may be incorporated in the cellulose acetate film. The deterioration inhibitor is described in Japanese Patent Provisional Publication Nos. 3(1991)-199201, 5(1993)-1907073, 5(1993)-194789, 5(1993)-271471 and 6(1994)-107854. The content of the deterioration inhibitor is preferably in the range of 0.01 to 1 wt. %, more preferably in the range of 0.01 to 0.2 wt. % based on the amount of the dope. If the content is less than 0.01 wt. %, the deterioration inhibitor gives little effect. If the content is more than 1 wt. %, the inhibitor often oozes out (bleeds out) to appear on the surface of the film. Particularly preferred deterioration inhibitors are butylated hydroxytoluene (BHT) and tribenzylamine (TBA).

(Surface Treatment of Cellulose Acetate Film)

The cellulose acetate film is preferably subjected to surface treatment. Examples of the surface treatment include glow discharge treatment, corona discharge treatment, ultraviolet (UV) treatment, flame treatment, and acid or alkali treatment. Further, an undercoating layer is preferably provided as described in Japanese Patent Provisional Publication No. 7(1995)-333433.

For ensuring the planeness of the film, the above treatments are carried out preferably at a temperature not higher than Tg (not higher than 150° C.).

In the case where the film is used as a protective film of the polarizing film, the acid or alkali treatment is preferably carried out to saponify the surface of the cellulose acetate film. That treatment enhances the adhesion between the polarizing film and the film. The surface energy is preferably not less than 55 mN/m, more preferably in the range of 60 to 75 mN/m.

The alkali saponification treatment is explained below.

That treatment comprises the steps of immersing the film surface in an alkaline solution, washing with water, and drying. The step of neutralizing with an acidic solution may be between the step of immersing the film surface and the step of washing.

Examples of the alkaline solution include solutions of KOH and NaOH. The normality of hydroxyl ion is preferably in the range of 0.1 to 3.0 N, more preferably in the range of 0.5 to 2.0 N. The temperature of the solution is preferably in the range of room temperature to 90° C., more preferably in the range of 40 to 70° C.

From the viewpoint of productivity, the alkaline solution is preferably coated on the film surface in place of immersing, and washed away with water. As the solvent for the coating solution, alcohols (e.g., IPA, n-butanol, methanol, ethanol) are preferred in consideration of wettability. Further, a dissolving aid such as water, propylene glycol or ethylene glycol is preferably added in the coating solution.

The surface energy can be measured by the contact angle method, the wet heating method or the adsorption method (these methods are described in 'The basic theory and application of wetting (written in Japanese)', published by Realize Co., Ltd, 1989). The contact angle method is preferred. In that method, two solutions having known surface energies are dropped onto the film. The contact angle of each drop is measured, and the surface energy of the film is calculated from the measured contact angles. The contact angle is, by definition, an angle (including the drop) between the film surface and the tangent of the drop surface at the crossing point.

(Discotic Liquid Crystal)

Examples of the disoctic liquid crystal compound include benzene derivatives described in C. Destrade et al., Mol. Cryst. vol. 71, pp. 111, (1981); truxene derivatives described in C. Destrade et al., Mol Cryst. vol. 122, pp. 141. (1985), Physics lett. A, vol. 78, pp. 82, (1990); cyclohexane derivatives described in B. Kohn et al., Angew. Chem. vol. 96, pp. 70, (1984); and macrocyclic compounds of azacrown-type or phenylacetylene-type described in J. M. Lehn et al., J. Chem. Commun. pp. 1794, (1985), and J. Zhang et al., J. Am. Chem. Soc. vol. 116, pp.2655, (1994).

The above discotic compound generally has a structure in which the discotic structure unit is located at the center as a parent core and further straight chain groups such as alkyl, alkoxy and substituted benzoyl are radially substituted. The discotic compound generally has the properties of liquid crystal, and hence includes a compound generally called discotic liquid crystal. As the discotic liquid compounds, any compound can be used so long as it has negative uniaxial property and orientation property. Substance derived from the discotic compound is not always the above-described compound. For example, the low molecular weight discotic liquid crystal compound having a thermo- or photo-reactive group is polymerized by heat or light to form a polymer that does not behave as liquid crystal. Such polymer can be also used in the invention. Preferred examples of the disotic liquid crystal compound are described in Japanese Patent Provisional Publication No. 8(1996)-50206.

The optically anisotropic layer of the invention is a negative birefringent layer containing a compound having one or more discotic structure units, and the discotic structure units preferably have planes inclined from a plane of the transparent support at an angle varying in (along) the direction of depth of the optically anisotropic layer.

The above-described angle (inclined angle) of the plane of discotic structure unit generally increases or decreases with increase of distance in the direction of depth from the bottom of the optically anisotropic layer. The inclined angle preferably increases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area where the inclined angle does not vary in the course of the thickness direction of the layer. The inclined angle preferably totally increases or decreases in the layer, even if it does not vary in the course. The inclined angle more preferably increases totally, and it is particularly preferred to increase continuously.

The optically anisotropic layer can be generally prepared by coating the orientation layer with a solution of the discotic compound and other compounds dissolved in a solvent, drying, heating to a temperature for forming a discotic nematic phase, and cooling with the oriented condition (discotic nematic phase) kept. Otherwise, the layer can be prepared by coating the orientation layer with a solution of the discotic compound and other compounds (e.g., polymerizable monomer, photo-polymerization initiator) dissolved in a solvent, drying, heating to a temperature for forming a discotic nematic phase, polymerizing the heated layer (e.g., by radiation of UV light) and cooling. The transition temperature from discotic nematic phase to solid phase (temperature for heating) is preferably in the range of 70 to 300° C., especially 70 to 170° C.

The inclined angle of the discotic unit on the support side can be generally controlled by selecting the discotic compound or materials of the orientation layer, or by selecting methods for the rubbing treatment. The inclined angle of the discotic unit on the surface side (air side) can be generally controlled by selecting the discotic compound or other compounds (e.g., plasticizer, surface active agent, polymerizable monomer and polymer) used together with the discotic compound. Further, the extent of variation of the inclined angle can be also controlled by the above selection.

Any compound can be employed as the plasticizer, the surface active agent and the polymerizable monomer, so long as it is compatible with the discotic compound and it gives variation of the inclined angle or dose not inhibit the discotic compound molecules from aligning. Preferred is polymerizable monomer (e.g., compounds having a vinyl, vinyloxy, acryloyl or methacryloyl group). Those compounds are preferably used in the amount of 1 to 50 wt. % (especially 5 to 30 wt. %) based on the amount of the discotic compound. Preferred examples of the polymerizable monomer include a acrylate having plural functional groups. The number of the functional groups is preferably three or more, more preferably four or more, most preferably six. Preferred examples of the acrylate having six functional groups include dipentaerythritol hexaacrylate. Two or more kinds of monomers having different numbers of functional groups can be mixed to use in combination.

As the polymer, any polymer can be employed, so long as it is compatible with the discotic compound and it gives variation of the inclined angle. Cellulose esters are preferably used. Examples of the cellulose esters include cellulose acetate, cellulose acetatepropionate, hydroxypropylcellulose and cellulose acetatebutylate. The polymer is generally used in an amount of 0.1 to 10 wt. % (preferably 0.1 to 8.0 wt. %, more preferably 0.1 to 5.0 wt. %) based on the amount of the compound having one or more discotic structure units, so as not to inhibit the discotic compound from aligning.

The optical compensatory sheet in the invention comprises a cellulose acetate film, an orientation layer and a discotic liquid crystal layer, piled up in order. The orientation layer is made of cross-linked polymer, and is subjected to rubbing treatment.

(Orientation Layer)

The orientation layer in the invention is made of cross-linked two polymers. At least one of the polymers may be cross-linked by itself or with a cross-linking agent. In other words, the polymers which originally have functional groups or to which functional groups are introduced are reacted with light, heat or pH variation to form the orientation layer; or otherwise linking groups are introduced by a reactive cross-linking agent into the polymers so that the polymers are cross-linked to form the orientation layer.

In a normal process, a coating liquid containing the polymer and, if needed, the cross-linking agent is applied on the transparent support, and then heated to induce the cross-linking reaction. However, as long as the resultant optical compensatory sheet has enough durability, the reaction may be caused at any stage from the step of coating the support with the coating liquid to the step of producing the resultant sheet. In consideration of orientation of the discotic compound (in the optically anisotropic layer) on the orientation layer, the cross-linking reaction is preferably caused sufficiently after the discotic compound is aligned. When the coating liquid containing the polymer and the cross-linking agent is applied and heated to dry on the support, the cross-linking reaction generally proceeds at a certain degree. However, if the heating temperature is low, the reaction further proceeds when the discotic compound is heated to the temperature to form discotic nematic phase. Therefore, after the applied and dried layer is subjected to rubbing treatment to form an orientation layer, another coating liquid containing the discotic compound is applied and heated to the temperature to form discotic nematic phase. The heated liquid on the orientation layer is cooled to prepare the optically anisotropic layer.

Polymers cross-linkable either by itself or with cross-linking agents can be used for forming the orientation layer in the invention. Some polymers are cross-linkable both by itself and with a cross-linking agent, and of course they are also usable. Examples of the polymers include polymethyl metacrylate, acrylic acid/methacrylic acid copolymer, styrene/maleinimide copolymer, polyvinyl alcohol and denatured polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethylcellulose, polyethylene, polypropylene, polycarbonate, and organic substances such as silan coupling agents. Preferred examples are water-soluble polymers such as poly(N-methylolacrylamide), carboxymethylcellulose, gelatin, polyvinyl alcohol and denatured polyvinyl alcohol. Polyvinyl alcohol and denatured polyvinyl alcohol are particularly preferred.

It is most preferred to use two kinds of polyvinyl alcohols or denatured polyvinyl alcohols having different polymerization degrees. The saponification degree of the polyvinyl alcohol is in the range of 70 to 100%, preferably in the range of 80 to 100%, more preferably in the range of 85 to 95%. The polymerization degree is preferably in the range of 100 to 3,000. Examples of the denatured polyvinyl alcohol include polyvinyl alcohols denatured by copolymerization (introduced denaturing group: COONa, $Si(OX)_3$, $N(CH_3)_3$. Cl, $C_9H_{19}COO$, $SO_3$, Na, $C_{12}H_{25}$, etc.), by chain transfer (introduced denaturing group: COONa, SH, $C_{12}H_{25}$, etc.) and by block polymerization (introduced denaturing group: COOH, $CONH_2$, COOR, $C_6H_5$, etc.). Non- or thio-denatured polyvinyl alcohols having saponification degrees of 80 to 100% (more preferably 85 to 95%) are particularly preferred. With respect to the denatured polyvinyl alcohols, Japanese Patent Provisional Publication No. 8(1996)-338913 describes in detail their syntheses, measurement of visible absorption spectra and method for determining the introducing ratios.

Examples of the cross-linking agent include aldehydes (e.g., formaldehyde, glyoxal, glutaraldehyde), N-methylol compounds (e.g., dimethylol urea, methyloldimethylhydantoin), dioxane derivatives (e.g., 2,3-dihydroxydioxane), compounds that works when the carboxylic group is activated (e.g., carbenium, 2-naphthalenesulfonate, 1,1-bispyrrolidino-1-chloropyridinium, 1-morpholinocarbonyl-3-(sulfonatoaminomethyl), active vinyl compounds (e.g., 1,3,5-triacryloyl-hexahydro-s-triazine, bis-(vinylsulfone) methane, N,N'-methylenebis-[β-vinylsulfonyl] propionamide), active halogen compounds (e.g., 2,4-dichloro-6-hydroxy-s-triazine), isooxazoles and dialdehyde starch. These are preferably used together with water-soluble polymers, particularly polyvinyl alcohol and denatured polyvinyl alcohols (including the above-described denatured polyvinyl alcohols). Two or more cross-linking agents may be used in combination. In consideration of productivity, reactive aldehydes are preferred. Particularly preferred is glutaraldehyde.

The more the cross-linking agent is added, the stronger moisture resistance the layer has. However, if the agent is incorporated in an amount of 50 wt. % or more based on the amount of the polymer, the resultant orientation layer shows poor orienting effect. Accordingly, the amount of the cross-linking agent is in the range of preferably 0.1 to 20 wt. %, more preferably 0.5 to 15 wt. % based on the amount of the polymer. The amount of non-reacted cross-linking agent remaining in the orientation layer is preferably not more than 1.0 wt. %, more preferably not more than 0.5 wt. % based on the amount of the orientation layer. If the layer contains the non-reacted agent in an amount of more than 1.0 wt. %, the layer has poor durability. A liquid crystal display comprising such orientation layer often suffers troubles of reticulation if used for a long time or left under hot and humid condition.

The orientation layer can be formed by the steps of applying a coating liquid containing the above polymer and cross-linking agent onto the transparent support, heating to dry and cross-link, and subjecting to rubbing treatment. As described above, the cross-linking reaction may be caused at any step after applying the coating liquid. In the case where a water-soluble polymer such as polyvinyl alcohol is used, the coating solution is preferably prepared from a mixed solvent of water and an organic solvent having defoaming character (e.g., methanol). The ratio of water/methanol is normally in the range of 0:100 to 99:1, preferably in the range of 0:100 to 91:9. Because of defoaming character of the organic solvent, defects on the orientation layer are remarkably decreased, and accordingly the optically anisotropic layer has an improved surface. As the coating method, known methods such as spin-coating, dip-coating, curtain-coating, extrusion-coating, bar-coating and E-type coating can be adopted. The E-type coating method is particularly preferred. The thickness of the layer is preferably in the range of 0.1 to 10 μm. The applied layer is dried at a temperature of 20 to 110° C. For ensuring sufficient cross-linking, the temperature is preferably in the range of 60 to 100° C., more preferably in the range of 80 to 100° C. The time for drying is in the range of 1 minute to 36 hours, preferably in the range of 5 minutes to 30 minutes. The pH is also preferably adjusted at an optimal value according to the used cross-linking agent. If glutaraldehyde is used as the cross-linking agent, the pH is preferably in the range of 4.5 to 5.5, more preferably at 5.0.

The orientation layer is provided on the transparent support or an undercoating layer. After the above-described polymer layer is cross-linked, the surface of the layer is subjected to rubbing treatment. The orientation layer determines the aligning direction of discotic liquid crystal compound provided thereon.

The rubbing treatment can be conducted in the manner adopted widely in aligning liquid crystal molecules of LCD. The surface of the layer is rubbed with paper, cloth (gauze, felt, nylon, polyester) or rubber along a certain direction, so as to give the aligning function. Generally, the layer is rubbed several times with cloth on which fibers having the same length and thickness are provided.

(Transparent Support)

The material of the support is preferably made of a highly transparent plastic resin. A preferred material is cellulose acetate, which is also used for a protective film of the polarizing film.

The transparent support, on which the optically anisotropic layer is provided, optically plays an important role. Therefore, the retardation value Re of the support is preferably in the range of 0 to 200 nm. The Rth of the support is preferably in the range of 70 to 400 nm.

The transparent support of the optical compensatory sheet preferably is a cellulose acetate film comprising cellulose acetate having an acetic acid content of 59.0 to 61.5% and an aromatic compound having at least two aromatic rings in an amount of 0.01 to 20 weight parts per 100 weight parts of the cellulose acetate. The cellulose acetate film preferably gives the Re retardation value defined by the following formula (I) in the range of 0 to 200 nm and the Rth retardation value defined by the following formula (II) in the range of 70 to 400 nm:

$$Re = (nx - ny) \times d \qquad (I)$$

$$Rth = \{(nx + ny)/2 - nz\} \times d \qquad (II)$$

in which nx is a refractive index along the slow axis in the film plane, ny is a refractive index along the traveling axis in the film plane, nz is a refractive index along the depth of the film, and d is thickness of the film.

If the liquid crystal display comprises two optically anisotropic cellulose acetate films, the Rth value of each film is preferably in the range of 70 to 250 nm.

If the liquid crystal display comprises one optically anisotropic cellulose acetate film, the Rth value of the film is preferably in the range of 150 to 400 nm.

The cellulose acetate film preferably has a birefringent index [Dn: nx−ny] of 0.00 to 0.002. The birefringent index along the film thickness [(nx+ny)/2−nz] is preferably in the range of 0.001 to 0.04.

The retardation value Re is determined according to the formula: Re=(nx−ny)×d in which nx is a refractive index along the show axis in the film plane (the maximum refractive index in the film plane), and ny is a refractive index perpendicular to the show axis in the film plane.

The retardation value Rth is determined according to the formula: Rth={(nx+ny)/2−nx}×d in which nx is a refractive index along the show axis in the film plane (the maximum refractive index in the film plane), ny is a refractive index along the traveling axis in the film plane (the minimum refractive index in the film plane), nz is a refractive index along the depth of the film, and d is thickness of the film in terms of nm.

(Polarizing Plate)

The polarizing plate preferably comprises two transparent protective films and a polarizing film (membrane) provided between the films. The cellulose acetate film described above can be used as one of the protective films. A normal cellulose acetate film can be used as the other protective film.

One of the protective films can function as a support of the optical compensatory sheet. The other of the protective films can function as a transparent base film of the diffusing film.

Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films.

The cellulose acetate films are placed so that the slow axes of the films may be essentially parallel to the transparent axis of the polarizing membrane.

It has been found that the moisture-permeability of the protective film is important for production of the polarizing film. In producing the polarizing film, the polarizing membrane and the protective film are laminated with an aqueous adhesive, and then the solvent of the adhesive is diffused into the film to dry. The higher permeability the film has, the more rapidly it is dried. Accordingly, the productivity of the polarizing film is improved. However, if the permeability is too high, the outer moisture is liable to come into the membrane to impair polarizability if the liquid crystal display is used under humid condition.

The moisture-permeability of the optical compensatory sheet depends upon various conditions such as thickness, free volume, and hydrophilicity (hydrophobicity) of the polymer film (and liquid crystal compound).

The protective film in the polarizing film has a moisture-permeability preferably in the range of 100 to 1,000 $g/m^2 \cdot 24$ hours, more preferably in the range of 300 to 700 $g/m^2 \cdot 24$ hours.

In the film forming process, conditions and procedures such as rip flow, line speed, stretching and/or compressing are adequately selected to control the thickness of the optical compensatory sheet. Since the moisture-permeability depends on the materials, the thickness may be controlled so that the preferable permeability can be obtained.

Also in the film forming process, drying conditions such as time and temperature are suitably determined to control the free volume of the optical compensatory sheet. Since the moisture-permeability depends on the materials, the free volume may be controlled so that the preferable permeability can be obtained.

The hydrophilicity (hydrophobicity) of the optical compensatory sheet can be controlled with additives. If hydrophilic additives are contained in the above free volume, the permeability is increased. If hydrophobic additives are added, the permeability is decreased.

The moisture-permeability can be thus independently controlled, and thereby the polarizing film having optical compensatory function can be produced at small cost with high productivity.

(Liquid Crystal Display)

The optical compensatory sheet or polarizing film comprising the above polymer film is advantageously used in a liquid crystal display.

A liquid crystal display of TN, MVA or OCB mode comprises two polarizing films and a liquid crystal cell provided between them. The liquid crystal cell comprises a pair of electrode substrates and liquid crystal molecules placed between them.

One compensatory sheet is placed between the cell and one of the polarizing films. Otherwise, two compensatory sheets are placed on both sides of the cell (i.e., each sheet is placed between the cell and each polarizing film).

If the liquid crystal cell works according to OCB mode, the compensatory sheet may comprise the optically anisotropic layer containing discotic or rod-like liquid crystal molecules. For forming the optically anisotropic layer, the discotic or rod-like liquid crystal molecules are aligned and fixed on the polymer film.

Since the discotic liquid crystal molecules give large birefringence and have various alignment forms, an optical compensatory sheet obtained from the discptic liquid crystal molecules has a specific optical characteristic that cannot be obtained from the conventional stretched birefringent polymer film. The optical compensatory sheet comprising the discptic liquid crystal compound is described in Japanese Patent Provisional Publication No. 6(1996)-214116, U.S. Pat. Nos. 5,583,679 and 5,646,703, and West German Patent Publication No. 3911620A1.

The above-described polymer film is used as the transparent protective film provided between the liquid crystal cell and the polarizing film. It may be placed as the protective film between the cell and either or each of the two polarizing films.

The liquid crystal cell works preferably according to VA mode, OCB mode or TN mode.

In a liquid crystal cell of VA mode, rod-like liquid crystal molecules are essentially vertically aligned while voltage is not applied.

The liquid crystal cell of VA mode include some types:

(1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied;

(2) a liquid crystal cell of MVA mode (described in SID97, Digest of tech. Papers, 28(1997), 845), in which the VA mode is modified to be multi-domain type so as to enlarge the viewing angle;

(3) a liquid crystal cell of n-ASM mode (described in Nippon Ekisho Toronkai [Liquid crystal forum of Japan], Digest of tech. Papers (1998), 58–59), in which rod-like liquid crystal molecules are essentially vertically aligned while voltage is not applied, and the molecules are essentially oriented in twisted multi-domain alignment while voltage is applied; and (4) a liquid crystal cell of SURVAIVAL mode (published in LCD international 98).

The liquid crystal cell of OCB mode is a liquid crystal cell of bend alignment mode in which rod-like liquid crystal molecules in upper part and ones in lower part are essentially reversely (symmetrically) aligned. A liquid crystal display having the liquid crystal cell of bend alignment mode is disclosed in U.S. Pat. Nos. 4,583,825 and 5,410,422. Since rod-like liquid crystal molecules in upper part and ones in lower part are symmetrically aligned, the liquid crystal cell of bend alignment mode has self-optical compensatory function. Therefore, this mode is referred to as OCB (optically compensatory bend) mode. The liquid crystal display of bend alignment mode has an advantage of responding rapidly.

In a liquid crystal cell of TN mode, rod-like liquid crystal molecules are essentially horizontally aligned while voltage is not applied, and oriented in a twisted alignment with a twisted angle of 60 to 120° C.

The liquid crystal cell of TN mode is widely used in color TFT liquid crystal displays, and hence is described in many publications.

The liquid crystal cell of ECB mode has been studied for long time, and hence is also described in many publications.

Preliminary Experiments (Preparation of Optical Compensatory Sheet Comprising Discotic Liquid Crystal: KH-01)

The following components were poured into a mixing tank, and stirred and heated to dissolve each component. Thus, a cellulose acetate solution was prepared.

| Cellulose acetate solution | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol (third solvent) | 11 weight parts |

16 Weight parts of the following retardation increasing agent, 80 weight parts of methylene chloride and 20 weight parts of methanol were poured into another mixing tank, and stirred and heated to prepare a retardation increasing agent solution.

(Retardation Increasing Agent)

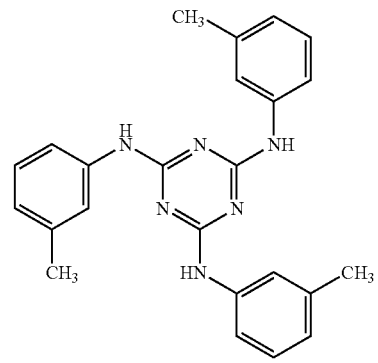

16 weight parts of the prepared retardation increasing agent solution and 484 weight parts of the cellulose acetate solution were mixed and stirred to prepare a dope. The amount of the retardation increasing agent was 2.0 weight parts based on 100 weight parts of cellulose acetate.

The prepared dope was cast by means of a band-casting machine. When the temperature of the dope on the band reached 40° C., the dope was dried for 1 minute and then peeled. The formed film was blown with hot air at 140° C. to prepare a cellulose acetate film (thickness: 80 μm) containing the solvent remaining in the amount of 0.3 wt. %.

The optical characters of the prepared cellulose acetate film (CAF-01) were measured to find that the Re and Rth were 5 nm and 83 nm, respectively.

The retardation values Re and Rth were measured at the wavelength of 633 nm by means of an ellipsometer (M-150, Japan Spectrum Co., Ltd.).

The prepared cellulose acetate film was immersed in 2.0 N KOH aqueous solution (25° C.), neutralized with sulfuric acid, washed with pure water, and dried. The surface energy of the thus-treated film was measured according to the contact angle method, and found 63 mN/m.

On the above-prepared cellulose acetate film, the following coating solution was applied in the amount of 28 ml/m$^2$ by means of a wire-bar coater of #16. The applied solution was blown with hot air at 60° C. for 60 seconds, and further with hot air at 90° C. for 150 seconds to dry. The dried layer was rubbed (rubbing treatment) along the longitudinal direction of the cellulose acetate film (transparent support).

| Coating solution for orientation layer | |
| --- | --- |
| The following denatured polyvinyl alcohol | 10 weight parts |
| Water | 371 weight parts |
| Methanol | 119 weight parts |
| Glutaric aldehyde (cross-linking agent) | 0.5 weight part |

(Denatured Polyvinyl Alcohol)

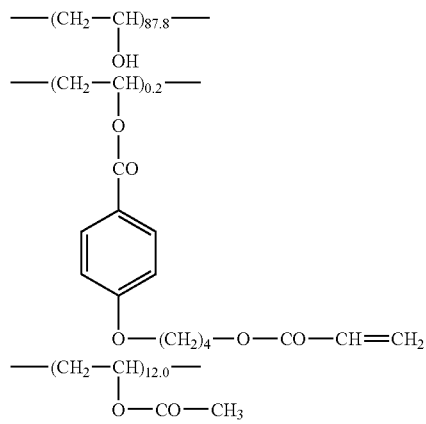

(Formation of Optically Anisotropic Layer)

To prepare a coating solution, 41.01 g of the following discotic (liquid crystal) compound, 4.06 g of ethylene oxide denatured trimethlolpropanetriacrylate (v#360, Osaka Organic Chemicals Co., Ltd.), 0.90 g of cellulose acetate butyrate (CAB-551-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation layer by means of a wire bar coater of #3.6. The thus-treated film was heated in a thermostat at 130° C. for 2 minutes to align molecules of the discotic compound. The film was then irradiated at 60° C. for 5 seconds with an ultraviolet ray emitted from a high pressure mercury lamp of 120 W/cm, so as to polymerize the discotic liquid crystal molecules. The film was cooled to room temperature. Thus, an optically anisotropic layer was formed to prepare an optical compensatory sheet (KH-01).

The Re retardation value was measured at 546 nm, and found 43 nm. The angle (inclined angle) between the discotic plane and the transparent support (cellulose acetate film) was 42° on average.

(Discotic Liquid Crystal Compound)

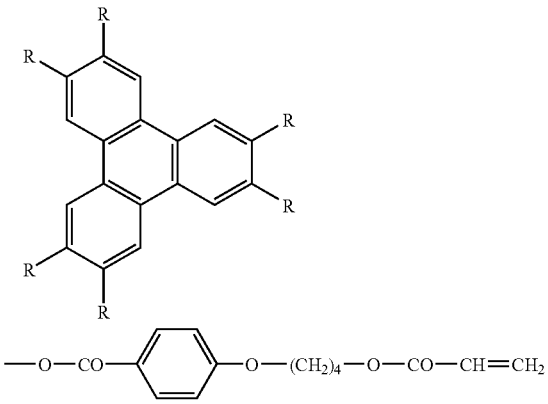

The obtained optical compensatory sheet (KH-01) was vertically cut along the rubbing direction with microtome, to prepare a very thin film sample. The sample was left under OsO$_4$ atmosphere for 48 hours, and then dyed. The dyed sample was observed with a transmission electron microscope (TEM) to obtain a photomicrograph. On the photomicrograph, there was an image given by dyed acryloyl groups of the discotic liquid crystal compound. The photomicrograph suggested that the molecules of the discotic compound in the optically anisotropic layer were inclined from the surface of the support and also that their inclined angles continuously increased along the depth in the range of 5 to 65° in accordance with increase of the distance from the bottom of the layer.

(Preparation of Diffusing Film: HKF-01)

In a mixed solvent of methyl ethyl ketone/methyl isobutyl ketone (20/80, by weight), 100 weight parts of ultraviolet curable resin (Desolite Z7526, JSR Co., Ltd.; refractive index: 1.51), 33 weight parts of cross-linked styrene beads (SX130H, Soken Kagaku Co., Ltd.; particles size: 1.3 μm; refractive index: 1.61) and 11 weight parts of cross-linked styrene beads (SX350H, Soken Kagaku Co., Ltd.; particles size: 3.5 μm; refractive index: 1.61) were mixed and dispersed so that the solid content might be 50%. The prepared solution was applied on a triacetyl cellulose film (TD-80U, Fuji Photo Film Co., Ltd.) to form a layer (dry thickness: 4.0 μm). The layer was dried, and then exposed to ultraviolet light (illuminance: 400 mW/cm$^2$, exposure: 300 mJ/cm$^2$) emitted from an air-cooled metal halide lamp of 160 W/cm (Eyegraphics Co., Ltd.) to harden the layer. Thus, a diffusing film (HKF-01) was prepared.

The haze of the prepared film was measured with a haze meter (MODEL 1001DP, Nippon Denshoku Kogyo Co., Ltd.) according to JIS-K-7105, and thereby it was found that the film had a proper haze (55%).

The surface roughness was 0.16 μm. The angular distribution of surface roughness was also measured by means of Surface Explore SX-520, and thereby it was found that the average angle of the distribution was 4.0° and that the distribution showed the maximum peak at 1.0°.

The section of the film was cut into a thin slice with microtome (CM1510, Leica), and the slice was observed with an electron microscope (S3500N/H) to find that the solvent soaked into the transparent base film in the depth of 0.03 μm.

(Preparation of Diffusing Film: HKF-02)

In a mixed solvent of methyl ethyl ketone/methyl isobutyl ketone (20/80, by weight), 100 weight parts of zirconium oxide-dispersed hard coat liquid (Desolite KZ-7114A, JSR Co., Ltd.), 43 weight parts of transparent resin (DPHA, Nippon Kayaku Co., Ltd.) and 5 weight parts of initiator (Irgacure 907, Ciba-Geigy) were mixed and dissolved with stirring by means of air-disperser. The prepared solution was applied, dried, and then exposed to ultraviolet light to harden the layer. The thus-formed layer has the refractive index of 1.64.

In the above solution, 21 weight parts of polymethyl methacrylate beads (MX150, Soken Kagaku Co., Ltd.; particles size: 1.5 μm; refractive index: 1.53) and 8.5 weight parts of polymethyl methacrylate beads (MX300, Soken Kagaku Co., Ltd.; particles size: 3.0 μm; refractive index: 1.53) were mixed and dispersed. The solid content of the solution was controlled with methyl ethyl ketone/methyl isobutyl ketone (20/80, by weight) at 53%. The prepared solution was applied on a triacetyl cellulose film (TD-80U, Fuji Photo Film Co., Ltd.) to form a layer (dry thickness: 2.7 μm). The layer was dried, and then exposed to ultraviolet light (illuminance: 400 mW/cm$^2$, exposure: 300 mJ/cm$^2$) emitted from an air-cooled metal halide lamp of 160 W/cm (Eyegraphics Co., Ltd.) to harden the layer. Thus, a diffusing film (HKF-02) was prepared.

The haze of the prepared film was measured with a haze meter (MODEL 1001DP, Nippon Denshoku Kogyo Co., Ltd.) according to JIS-K-7105, and thereby it was found that the film had a proper haze (63%).

The surface roughness was 0.15 μm. The angular distribution of surface roughness was also measured by means of Surface Explore SX-520, and thereby it was found that the average angle of the distribution was 3.5° and that the distribution showed the maximum peak at 1.0°.

The section of the film was cut into a thin slice with microtome (CM1510, Leica), and the slice was observed with an electron microscope (S3500N/H) to find that the solvent soaked into the transparent base film in the depth of 0.02 μm.

(Preparation of Diffusing Film: HKF-03)

In a mixed solvent of methyl ethyl ketone/cyclohexanone (6/4, by weight), 100 weight parts of ultraviolet curable resin (DPHA, Nippon Kayaku Co., Ltd.; refractive index: 1.51), 3 weight parts of initiator (Irgacure 907, Ciba-Geigy) and 11 weight parts of cross-linked styrene beads (Soken Kagaku Co., Ltd.; particles size: 1.3 μm; refractive index: 1.61) were mixed and dispersed so that the solid content might be 11%. The prepared solution was applied on a triacetyl cellulose film (TD-80U, Fuji Photo Film Co., Ltd.) to form a layer (dry thickness: 2.0 μm). The layer was dried, and then exposed to ultraviolet light in the amount of 140 mJ to prepare the first layer.

Independently, 100 weight parts of ultraviolet curable resin (DPHA, Nippon Kayaku Co., Ltd.; refractive index: 1.51), 3 weight parts of initiator (Irgacure 907, Ciba-Geigy), 6 weight parts of cross-linked styrene beads (Soken Kagaku Co., Ltd.; particles size: 3.5 μm; refractive index: 1.61) and 16 weight parts of cross-linked styrene beads (Soken Kagaku Co., Ltd.; particles size: 1.3 μm; refractive index: 1.61) were mixed and dispersed in a mixed solvent of methyl ethyl ketone/cyclohexanone (6/4, by weight), so that the solid content might be 22%. The prepared solution was applied on the first layer to form the second layer (dry thickness: 3.0 μm). The formed layer was dried, and then exposed to ultraviolet light (illuminance: 400 mW/cm$^2$, exposure: 300 mJ/cm$^2$) emitted from an air-cooled metal halide lamp of 160 W/cm (Eyegraphics Co., Ltd.) to harden the layer. Thus, a diffusing film (HKF-P3) was prepared.

The haze of the prepared film was measured with a haze meter (HR-100, Murakami Institute of Coloring technology) according to JIS-K-7105, and thereby it was found that the film had a proper haze (56%).

On the film HKF-P3, the following coating solution for low refractive index layer was applied by means of a bar coater. The applied solution was dried at 80° C., and then further heated at 120° C. for 8 minutes to cross-link the polymer, to prepare a low refractive index layer (thickness: 0.096 μm). Thus, an anti-glare diffusing film (HKF-03) was prepared.

(Preparation of Coating Solution for Low Refractive Index Layer)

Into 2,240 g of a thermo-cross-linkable fluorine-containing polymer (JN-7228, JSR Co., Ltd.; refractive index: 1.42, solid content: 6 wt. %, in the form of methyl ethyl ketone solution), 192 g of SiO$_2$ gel dispersed in methyl ethyl ketone (MEK-ST, Nissan Chemicals Co., Ltd.; mean particle size: 10 to 20 μm, solid content: 30 wt. %), 2,224 g of methyl ethyl ketone and 144 g of cyclohexanone were added and stirred. The obtained liquid was filtrated through a propylene filter (PPE-01, porous size: 1 μm) to prepare a coating solution for low refractive index layer.

(Preparation of Polarizing Film on Observer Side: SHB-01)

Iodine was adsorbed on a stretched polyvinyl alcohol film to prepare a polarizing membrane. The film HKF-01 was saponified, and laminated on one surface of the polarizing membrane with polyvinyl adhesive so that the transparent base film (triacetyl cellulose film) might be contact with the membrane. The optical compensatory sheet KH-01 was also saponified, and laminated on the other surface of the membrane with polyvinyl adhesive so that the cellulose acetate film (CAF-01) might be contact with the membrane. Thus, a polarizing film on observer side (SHB-01) was prepared.

(Preparation of Polarizing Film on Observer Side: SHB-02)

Iodine was adsorbed on a stretched polyvinyl alcohol film to prepare a polarizing membrane. The film HKF-02 was saponified, and laminated on one surface of the polarizing membrane with polyvinyl adhesive so that the transparent base film (triacetyl cellulose film) might be contact with the membrane. The optical compensatory sheet KH-01 was also saponified, and laminated on the other surface of the membrane with polyvinyl adhesive so that the cellulose acetate film (CAF-01) might be contact with the membrane. Thus, a polarizing film on observer side (SHB-02) was prepared.

(Preparation of Polarizing Film on Observer Side: SHB-03)

Iodine was adsorbed on a stretched polyvinyl alcohol film to prepare a polarizing membrane. The film HKF-03 was saponified, and laminated on one surface of the polarizing membrane with polyvinyl adhesive so that the transparent base film (triacetyl cellulose film) might be contact with the membrane. The optical compensatory sheet KH-01 was also saponified, and laminated on the other surface of the membrane with polyvinyl adhesive so that the cellulose acetate film (CAF-01) might be contact with the membrane. Thus, a polarizing film on observer side (SHB-03) was prepared.

(Preparation of Polarizing Film on Observer Side: SHB-H1)

Iodine was adsorbed on a stretched polyvinyl alcohol film to prepare a polarizing membrane. A commercially available triacetyl cellulose film (Fujitac TD80, Fuji Photo Film Co., Ltd.) was saponified, and laminated on one surface of the polarizing membrane with polyvinyl adhesive. The optical compensatory sheet KH-01 was also saponified, and laminated on the other surface of the membrane with polyvinyl adhesive so that the cellulose acetate film (CAF-01) might be contact with the membrane. Thus, a polarizing film on observer side (SHB-H1) was prepared.

EXAMPLE 1

A pair of polarizing films were removed from a commercially available liquid crystal display of TN mode (6E-A3, Sharp Corporation). In place of the removed polarizing films, the polarizing film (SHB-01) was laminated on the observer side surface with adhesive so that the film KH-01 might be on the liquid crystal cell side. On the backlight side, the polarizing film (SHB-H1) was laminated with adhesive so that the film KH-01 might be on the liquid crystal cell side. The polarizing plate on the observer side and that on the backlight side were placed so that the transparent axes of the observer side plate and the backlight side plate might be arranged in 0 mode. Thus, the liquid crystal display was prepared.

The viewing angle of the prepared liquid crystal display was measured by means of a measuring apparatus (EZ-Contrast 160D, ELDIM) when each of the eight tones of black (L1) to white (L8) was displayed. Further, the chromaticity difference at middle tone (L3) was also measured. The results are set forth in Table 1.

EXAMPLE 2

A pair of polarizing films were removed from a commercially available liquid crystal display of TN mode (6E-A3, Sharp Corporation). In place of the removed polarizing films, the polarizing film (SHB-02) was laminated on the observer side surface with adhesive so that the film KH-01 might be on the liquid crystal cell side. On the backlight side, the polarizing film (SHB-H1) was laminated with adhesive so that the film KH-01 might be on the liquid crystal cell side. The polarizing plate on the observer side and that on the backlight side were placed so that the transparent axes of the observer side plate and the backlight side plate might be arranged in 0 mode. Thus, the liquid crystal display was prepared.

The viewing angle of the prepared liquid crystal display was measured by means of a measuring apparatus (EZ-Contrast 160D, ELDIM) when each of the eight tones of black (L1) to white (L8) was displayed. Further, the chromaticity difference at middle tone (L3) was also measured. The results are set forth in Table 1.

EXAMPLE 3

A pair of polarizing films were removed from a commercially available liquid crystal display of TN mode (6E-A3, Sharp Corporation). In place of the removed polarizing films, the polarizing film (SHB-03) was laminated on the observer side surface with adhesive so that the film KH-01 might be on the liquid crystal cell side. On the backlight side, the polarizing film (SHB-H1) was laminated with adhesive so that the film KH-01 might be on the liquid crystal cell side. The polarizing plate on the observer side and that on the backlight side were placed so that the transparent axes of the observer side plate and the backlight side plate might be arranged in 0 mode. Thus, the liquid crystal display was prepared.

The viewing angle of the prepared liquid crystal display was measured by means of a measuring apparatus (EZ-Contrast 160D, ELDIM) when each of the eight tones of black (L1) to white (L8) was displayed. Further, the chromaticity difference at middle tone (L3) was also measured. The results are set forth in Table 1.

COMPARATIVE EXAMPLE 1

A pair of polarizing films were removed from a commercially available liquid crystal display of TN mode (6E-A3, Sharp Corporation). In place of the removed polarizing films, the polarizing film (SHB-H1) was laminated on the observer side surface with adhesive so that the film KH-01 might be on the liquid crystal cell side. On the backlight side, the polarizing film (SHB-H1) was laminated with adhesive so that the film KH-01 might be on the liquid crystal cell side. The polarizing plate on the observer side and that on the backlight side were placed so that the transparent axes of the observer side plate and the backlight side plate might be arranged in 0 mode. Thus, the liquid crystal display was prepared.

The viewing angle of the prepared liquid crystal display was measured by means of a measuring apparatus (EZ-Contrast 160D, ELDIM) when each of the eight tones of black (L1) to white (L8) was displayed. Further, the chromaticity difference at middle tone (L3) was also measured. The results are set forth in Table 1.

EXAMPLE 4

(Preparation of Diffusing Film: HKF-04)

In a mixed solvent of methyl ethyl ketone/MEK (75/25, by weight), 47.6 weight parts of ultraviolet curable resin (Desolite KZ-7114C, Nippon Kayaku Co., Ltd.), 14.4 weight parts of ultraviolet curable resin (DPHA, Nippon Kayaku Co., Ltd.), 4.8 weight parts of silane coupling agent (KBM5103, Showa Denko K. K.), 14.8 weight parts of silica particles (Seehostar KE-P150, Nippon Shokubai Co., Ltd.; mean particle size: 1.5 µm, refractive index: 1.45) methyl isobutyl ketone dispersion (solid content: 30%) and polymethyl methacrylate particles (MX300, Soken Kagaku Co., Ltd.; mean particles size: 3.0 µm; refractive index: 1.51) methyl isobutyl ketone dispersion (solid content: 25%) were mixed and dispersed so that the solid content might be 52%. The prepared solution was applied on a triacetyl cellulose film (TD-80U, Fuji Photo Film Co., Ltd.) to form a layer (dry thickness: 4.0 µm). The layer was dried, and then exposed to ultraviolet light in the amount of 140 mJ to harden the layer. Thus, a diffusing film (HKF-P4) was prepared.

The haze of the prepared film was measured with a haze meter (HR-100, Murakami Institute of Coloring technology) according to JIS-K-7105, and thereby it was found that the film had a proper haze (66%).

On the film HKF-P3, the following coating solution for low refractive index layer was applied by means of a bar coater. The applied solution was dried at 80° C., and then further heated at 120° C. for 8 minutes to cross-link the polymer, to prepare a low refractive index layer (thickness: 0.096 µm). Thus, an anti-glare diffusing film (HKF-04) was prepared.

(Preparation of Coating Solution for Low Refractive Index Layer)

Into 2,240 g of thermo-cross-linkable fluorine-containing polymer (JN-7228, JSR Co., Ltd.; refractive index: 1.42, solid content: 6 wt. %, in the form of methyl ethyl ketone solution), 192 g of $SiO_2$ gel dispersed in methyl ethyl ketone (MEK-ST, Nissan Chemicals Co., Ltd.; mean particle size: 10 to 20 µm, solid content: 30 wt. %), 2,224 g of methyl ethyl ketone and 144 g of cyclohexanone were added and stirred. The obtained liquid was filtrated through a propylene filter (PPE-01, porous size: 1 µm) to prepare a coating solution for low refractive index layer.

(Preparation of Optical Compensatory Sheet Comprising Discotic Liquid Crystal: DKH-02)

The following components were poured into a mixing tank, and stirred and heated to dissolve or disperse each component. Thus, a cellulose acetate solution was prepared.

| Cellulose acetate solution | |
| --- | --- |
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Silica particles (matting agent, mean size: 10 nm) | 0.15 weight part |
| Methylene chloride (first solvent) | 300 weight parts |
| Methanol (second solvent) | 54 weight parts |
| 1-Butanol (third solvent) | 11 weight parts |

16 Weight parts of the retardation increasing agent, 80 weight parts of methylene chloride and 20 weight parts of methanol were poured into another mixing tank, and stirred and heated to prepare a retardation increasing agent solution.

36 Weight parts of the prepared retardation increasing agent solution and 464 weight parts of the cellulose acetate solution were mixed and stirred to prepare a dope. The amount of the retardation increasing agent was 5.0 weight parts based on 100 weight parts of cellulose acetate.

The prepared dope was cast by means of a band-casting machine. When the temperature of the dope on the band reached 40° C., the dope was dried for 1 minute and then peeled. While blown with hot air at 140° C., the formed film was laterally stretched by 28%. The film was blown with hot air at 135° C. to prepare a cellulose acetate film support (PK-1, thickness: 92 µm) containing the solvent remaining in the amount of 0.3 wt. %.

The optical characters of the prepared cellulose acetate film (PK-1) were measured to find that the Re and Rth were 43 nm and 175 nm, respectively.

The retardation values Re and Rth were measured at the wavelength of 590 nm by means of an ellipsometer (M-150, Japan Spectrum Co., Ltd.).

The prepared cellulose acetate film was immersed in 2.0 N KOH aqueous solution (25° C.) for 2 minutes, neutralized with sulfuric acid, washed with pure water, and dried. The surface energy of the thus-treated film was measured according to the contact angle method, and found 63 mN/m.

On the prepared film (PK-1), the following coating solution was applied in the amount of 28 ml/m² by means of a wire-bar coater of #16. The applied solution was blown with hot air at 60° C. for 60 seconds, and further with hot air at 90° C. for 150 seconds to dry. The dried layer was rubbed (rubbing treatment) at the angle of 45° to the slow axis (at 632.8 nm) of the film (PK-1).

| Coating solution for orientation layer | |
| --- | --- |
| The denatured polyvinyl alcohol | 10 weight parts |
| Water | 371 weight parts |
| Methanol | 119 weight parts |
| Glutaric aldehyde (cross-linking agent) | 0.5 weight part |

(Formation of Optically Anisotropic Layer)

To prepare a coating solution, 41.01 g of the discotic liquid crystal compound, 4.06 g of ethylene oxide denatured trimethlolpropanetriacrylate (V#360, Osaka Organic Chemicals Co., Ltd.), 0.35 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation layer by means of a wire bar coater of #4. The thus-treated film was fixed on a metal frame, and heated in a thermostat at 130° C. for 2 minutes to align the molecules of the discotic compound. The film was then irradiated at 130 ° C. for 1 second with an ultraviolet ray emitted from a high pressure mercury lamp of 120 W/cm, so as to polymerize the discotic liquid crystal molecules. The film was cooled to room temperature. Thus, an optically anisotropic layer was formed to prepare an optical compensatory sheet (KH-H1).

The Re retardation value was measured at 546 nm, and found 38 nm. The angle (inclined angle) between the discotic plane and the transparent support (cellulose acetate film) was 40° on average.

(Preparation of Polarizing Film on Observer Side: SHB-04)

Iodine was adsorbed on a stretched polyvinyl alcohol film to prepare a polarizing membrane. The film HKF-04 was saponified, and laminated on one surface of the polarizing membrane with polyvinyl adhesive so that the transparent base film (triacetyl cellulose film) might be contact with the membrane. The optical compensatory sheet DKH-01 was also saponified, and laminated on the other surface of the membrane with polyvinyl adhesive so that the cellulose acetate film might be contact with the membrane. Thus, a polarizing film on observer side (SHB-04) was prepared. The transparent axis of the polarizing film was placed parallel to the slow axis of the triacetyl cellulose film support of DKH-01.

(Preparation of Polarizing Film on Backlight Side: SHB-B4)

Iodine was adsorbed on a stretched polyvinyl alcohol film to prepare a polarizing membrane. A commercially available triacetyl cellulose film (Fujitac TD80, Fuji Photo Film Co., Ltd.) was saponified, and laminated on one surface of the polarizing membrane with polyvinyl adhesive. The optical compensatory sheet DKH-01 was also saponified, and laminated on the other surface of the membrane with polyvinyl adhesive so that the cellulose acetate film might be contact with the membrane. Thus, a polarizing film on backlight side (SHB-B4) was prepared. The transparent axis of the polarizing film was placed parallel to the slow axis of the triacetyl cellulose film support of DKH-01.

(Production of Liquid Crystal Cell of Bend Alignment Mode)

On a glass plate having an ITO transparent electrode, an orientation layer of polyimide was provided and subjected to a rubbing treatment. This procedure was repeated to prepare two substrates, and the substrates were arranged face-to-face so that the rubbing directions might be parallel to each other and that the cell gap might be 6 μm. Into the gap, a liquid crystal having Δn of 0.1396 (ZLI1132, Merck & Co., Inc.) was introduced to prepare a liquid crystal cell of bend alignment mode. The size of the prepared liquid crystal cell was 20 inches.

The prepared liquid crystal cell of bend alignment mode was sandwiched between the above-prepared polarizing films SHB-04 and SHB-B4. The elliptically polarizing film was laminated so that the optically anisotropic layer of the plate might face to the cell and so that the rubbing direction of the optically anisotropic layer might be anti-parallel to the rubbing direction of the cell substrate.

Voltage of a square wave (55 Hz) was applied to the liquid crystal cell, and an image was displayed according to normally white mode (white: 2V, black: 5V). A ratio of the transmittance (white/black) was measured as a contrast ratio. The viewing angle of the prepared liquid crystal display was measured by means of a measuring apparatus (EZ-Contrast 160D, ELDIM) when each of the eight tones of black (L1) to white (L8) was displayed. Further, the chromaticity difference at middle tone (L3) was also measured. The results are set forth in Table 1.

COMPARATIVE EXAMPLE 2

The procedure of Example 4 was repeated except that the liquid crystal display was produced by placing the liquid crystal cell of bend alignment mode between two plaraizing plates of SHB-B4. The viewing angle and the chromaticity difference were measured in the same manner. The results are set forth in Table 1.

TABLE 1

| Display | Viewing angle[1] | | | Reflection[2] | ΔCuv |
| --- | --- | --- | --- | --- | --- |
| | Up | Down | Right-left | | |
| Example 1 | 70° | 65° | 160° | Good | 0.038 |
| Example 2 | 75° | 60° | 160° | Good | 0.042 |
| Example 3 | 75° | 60° | 160° | Excellent | 0.033 |
| Example 4 | 80° | 80° | 160° | Poor[3] | 0.018 |
| Comp. Ex. 1 | 60° | 35° | 150° | Poor | 0.063 |
| Comp. Ex. 2 | 70° | 70° | 160° | Poor | 0.052 |

Remarks:
[1]Viewing angle giving a contrast ratio of 10 or more without tone inversion (upward, downward and right-left ward), and
[2]Grade of preventing the screen from reflecting surrounding scenes.
[3]Though reflection was poor, the surface roughness of the polarizing film was not obsercved.

The invention claimed is:

1. A liquid crystal display of transmission type which comprises a light source, a polarizing film, a liquid crystal cell and another polarizing film in this order, an optical compensatory sheet being further provided between said liquid crystal cell and said polarizing film on a light source side or between said liquid crystal cell and said polarizing film on a display side, said optical compensatory sheet comprising a transparent support and an optically anisotropic layer, which contains a discotic compound having a discotic plane, which is inclined from a surface of the support surface at an angle varying along a direction of depth of the optically anisotropic layer, wherein the liquid crystal display has a difference in chromaticity of 0.05 or less between an image seen frontally and an image seen rightward or leftward at a viewing angle of 60°, wherein a diffusing film is provided on a display side surface of the polarizing film on the display side, said diffusing film having a diffusing layer in which first and second transparent fine particles are dispersed in a transparent resin, said first transparent fine particles having a mean particle size in the range of 0.6 to 1.8 μm, said second transparent fine particles having a mean particle size in the range of 2.2 to 4.7 μm, said first and second transparent fine particles having refractive indices that are different from a refractive index of the transparent resin, wherein the first and second fine particles are plastic beads, and wherein the difference in refractive index between the transparent fine particles and the transparent resin is in the range of 0.02 to 0.15.

2. The liquid crystal display as defined in claim 1, wherein the diffusing film has a haze value of 40% or more.

3. The liquid crystal display as defined in claim 1, wherein a low refractive index layer is provided as an anti-reflection layer on the diffusing layer, said low refractive index layer having a refractive index of 1.35 to 1.45.

4. The liquid crystal display as defined in claim 3, wherein the low refractive index layer is made of a hardened composition comprising inorganic fine particles and a fluorine-containing compound cross-linked with heat or ionization radiation.

5. The liquid crystal display as defined in claim 1, wherein the diffusing film shows an integrating sphere reflectance of 2.5% or less in the wavelength region of 450 to 650 nm.

6. The liquid crystal display as defined in claim 1, wherein the transparent support of the optical compensatory sheet is a cellulose acetate film comprising cellulose acetate having an acetic acid content of 59.0 to 61.5% and an aromatic compound having at least two aromatic rings in an amount of 0.01 to 20 weight parts per 100 weight parts of the cellulose acetate, said film giving the Re retardation value defined by the following formula (I) in the range of 0 to 200 nm and the Rth retardation value defined by the following formula (II) in the range of 70 to 400 nm:

$$Re = (nx - ny) \times d \quad (I)$$

$$Rth = \{(nx + ny)/2 - nz\} \times d \quad (II)$$

in which nx is a refractive index along the slow axis in the film plane, ny is a refractive index along the traveling axis in the film plane, nz is a refractive index along the depth of the film, and d is a thickness of the film.

7. The liquid crystal display as defined in claim 6, wherein the cellulose acetate film is formed from a solution containing a solvent selected from the group consisting of an ether having 3 to 12 carbon atoms, a ketone having 3 to 12 carbon atoms, and an ester having 3 to 12 carbon atoms.

8. The liquid crystal display as defined in claim 6, wherein the cellulose acetate film comprises two or more layers, which are formed according to a co-casting method.

9. The liquid crystal display as defined in claim 1, wherein the liquid crystal cell is of a TN mode or an OCB mode.

10. The liquid crystal display as defined in claim 1, wherein the first transparent fine particles have a mean particle size in the range of 0.7 to 1.6 μm, and the second transparent fine particles have a mean particle size in the range of 2.4 to 4.5 μm.

11. The liquid crystal display as defined in claim 1, wherein the diffusing layer further comprises inorganic filler comprising grains having sizes of 0.5 μm or less.

* * * * *